No. 848,183. PATENTED MAR. 26, 1907.
A. LUKE.
CLUTCH FOR BELT PULLEYS.
APPLICATION FILED MAY 31, 1905.
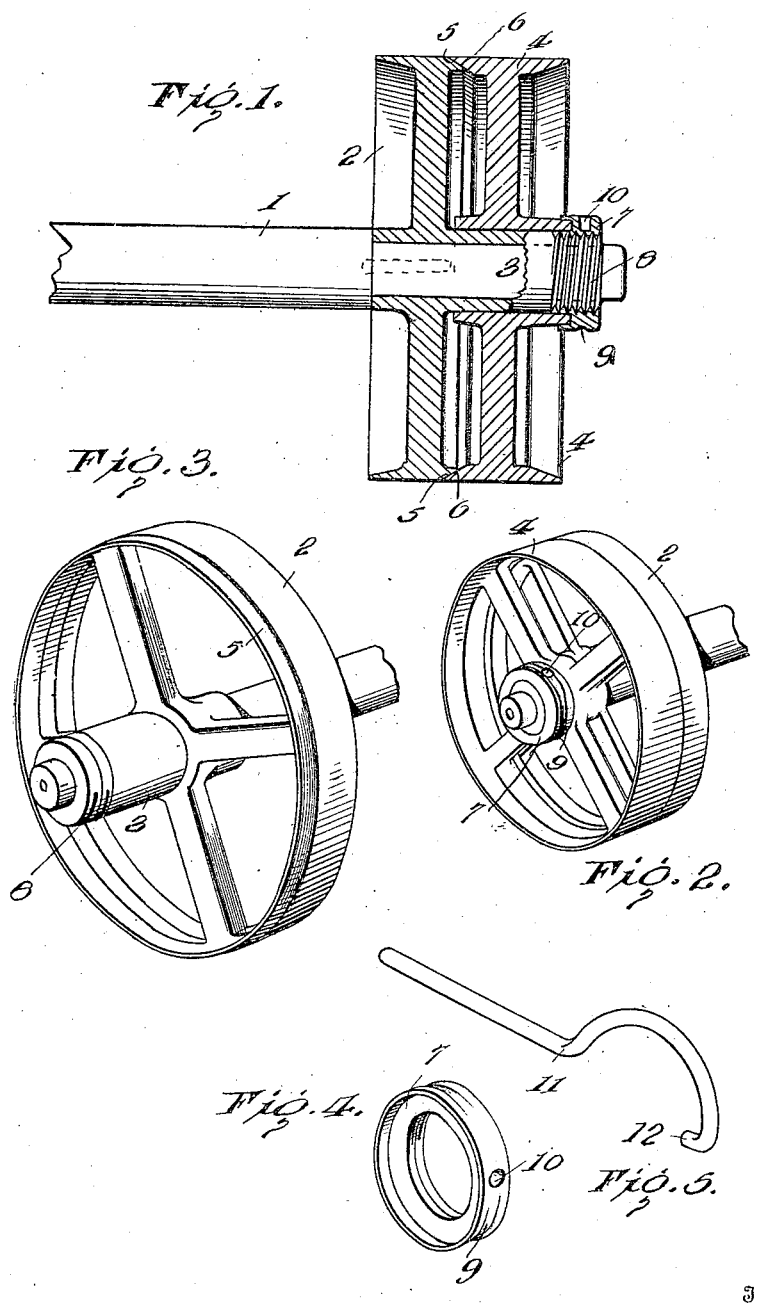
Witnesses
Inventor
A. Luke.
By ..........., Attorneys

UNITED STATES PATENT OFFICE.

ABRAHAM LUKE, OF ELKHART, INDIANA.

CLUTCH FOR BELT-PULLEYS.

No. 848,183.  Specification of Letters Patent.  Patented March 26, 1907.

Application filed May 31, 1905. Serial No. 263,082.

*To all whom it may concern:*

Be it known that I, ABRAHAM LUKE, a citizen of the United States, residing at Elkhart, in the county of Elkhart and State of Indiana, have invented certain new and useful Improvements in Clutches for Belt-Pulleys, of which the following is a specification.

The invention embodies novel improvements in clutch for belt-pulleys of that type particularly designed for use in connection with belts for transmitting power from traction-engines to agricultural machines, such as threshers or the like.

The invention is designed to facilitate throwing of the drive-belt upon the drive-pulley of the traction-engine, simultaneously tightening said belt.

The invention also includes special means for shifting the clutch or loose pulley with the driving-pulley, as will be pointed out more clearly hereinafter.

For a full description of the invention and the merits thereof and also to acquire a knowledge of the details of construction of the means for effecting the result reference is to be had to the following description and accompanying drawings, in which—

Figure 1 is a vertical longitudinal sectional view through a device embodying the invention, the driving-shaft being partially broken away. Fig. 2 is a perspective view looking from the outer side of the loose pulley, bringing out more clearly the adjusting means therefor. Fig. 3 is a detail perspective view of the driving-pulley and driving-shaft alone. Fig. 4 is a perspective view of the adjusting-thimble for the loose pulley. Fig. 5 is a view of the tool preferably used for adjusting the thimble.

Corresponding and like parts are referred to in the following description and indicated in all the views of the drawings by the same reference characters.

The numeral 1 indicates the drive-shaft, which is ordinarily provided upon the traction-engine. However, since the invention is applicable in different ways in order to accomplish the purposes above set forth said shaft 1 may be a drive-shaft of any engine or motor within the contemplation of the invention.

Keyed to the drive-shaft 1 is a drive-pulley 2, said pulley having a hub extension 3 projected laterally from the hub portion thereof, upon which a loose pulley 4 is adapted to operate. The rim members of the drive-pulley 2 and the loose pulley 4 are adapted to be forced into contact in order to clutch these pulleys together, and to increase the effectiveness of the clutching action it is designed that the adjacent portions of the rims of the pulleys 2 and 4 be beveled or chamfered, as shown at 5 and 6, the portion 5 of the pulley 2 being beveled from the face of the pulley, whereas the similar portion 6 of the pulley 4 bevels or inclines from the inner side of the rim. The adjacent portions of the two pulleys 2 and 4 may be of slightly greater diameter than the outer or more remote portions, so as to cause the belt to automatically feed upon the pulley 2 in the preliminary operation of placing the same thereon. It will be noted that the pulley 4 being loosely mounted upon the extension 3 of the pulley 2 relieves the shaft 1 of all wear which would otherwise be received thereon.

The means for adjusting the pulley 4, whereby the same is thrown into clutch with the pulley 2, comprises a thimble 7, internally threaded and adapted to screw upon the outer extremity of the extension 3, which is also threaded, as shown at 8, for this purpose. The thimble 7 is preferably annularly grooved upon the outer side, as shown at 9, and formed with an opening 10 in the peripheral portion to facilitate unscrewing and screwing the same with a suitable tool, such as a curved bar 11. (Illustrated in Fig. 5 of the drawing.) The bar 11 is adapted to extend about the thimble, being received in the grooved portion 9 thereon, and a stud 12 upon an extremity of the bar will fit into the opening 10, so that the thimble may be screwed hard against the adjacent portion of the hub of the pulley 4 to force the latter into clutch with the pulley 2. The innermost portion of the thimble 7 receives the outermost extremity of the pulley 4, so that the thimble also prevents entrance of dirt or foreign matter between the hub and the extension 3 aforesaid.

The device may be used in various ways, as will be apparent to those versed in the art to which the invention relates, and it will be noted that when the belt is upon the loose pulley 4 said pulley will revolve freely upon the hub extension 3 when the pulley 4 is not in clutch with the pulley 2 or the drive-shaft may turn with the drive-wheel 2 without operating the pulley 4 when the latter is out of clutch, the belt not being actuated either. When the thimble 7, however, is turned so as to force the pulley 4 against the pulley 2, the two pulleys will be clutched together for simultaneous rotation, and the belt will be caused to travel therearound, said pulleys forming virtually a single wheel, being of substantially the same diameter.

It will be observed that the exterior portion of the extension 3 is smooth save at the outer extremity thereof, which is provided with the threads shown at 8. The above admits of free lateral movement of the loose pulley toward the drive-pulley under the actuation of the thimble when the latter is turned in the proper direction.

Having thus described the invention, what is claimed as new is—

1. In a device of the class described, the combination of a drive-shaft, a drive-pulley rotatable with said shaft, a loose pulley arranged at one side of the drive-pulley and freely movable toward and from the same, and an adjustable thimble so connected as to force the loose pulley into clutch with the drive-pulley as specified.

2. In a device of the class described, the combination of a drive-shaft, a drive-pulley mounted thereon for rotation therewith, said drive-pulley being provided with a hub extension, the exterior portion of which is smooth save for threads at the outer extremity, a loose pulley rotatable upon the hub extension of the drive-pulley and freely slidable longitudinally of said hub extension so as to move toward and from the drive-pulley, and a threaded thimble applied to the threaded portion of the hub extension aforesaid and overlapping the hub portion of the loose pulley, said thimble being adapted by rotation thereof to force the loose pulley into clutch engagement with the drive-pulley.

In testimony whereof I affix my signature in presence of two witnesses.

ABRAHAM LUKE. [L. S.]

Witnesses:
EDWARD B. ZIGLER,
JAMES L. HARMAN.